(12) United States Patent
Berlin

(10) Patent No.: US 9,267,027 B2
(45) Date of Patent: *Feb. 23, 2016

(54) RESIN COMPOSITIONS COMPRISING LIGNIN DERIVATIVES

(75) Inventor: Alex Berlin, Davis, CA (US)

(73) Assignee: FIBRIA INNOVATIONS INC., Vancouver (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/322,890

(22) PCT Filed: May 27, 2010

(86) PCT No.: PCT/CA2010/000800
§ 371 (c)(1),
(2), (4) Date: Feb. 15, 2012

(87) PCT Pub. No.: WO2010/135832
PCT Pub. Date: Dec. 2, 2010

(65) Prior Publication Data
US 2012/0136097 A1    May 31, 2012

Related U.S. Application Data

(60) Provisional application No. 61/182,044, filed on May 28, 2009, provisional application No. 61/233,345, filed on Aug. 12, 2009, provisional application No. 61/304,745, filed on Feb. 15, 2010.

(51) Int. Cl.
*C08L 97/00* (2006.01)
*C08L 61/12* (2006.01)
(Continued)

(52) U.S. Cl.
CPC ............. *C08L 61/12* (2013.01); *C07G 1/00* (2013.01)*C08H 6/00* (2013.01); *C08H 8/00* (2013.01); ; *C08L 1/10* (2013.01); *C08L 61/06* (2013.01); *C08L 97/005* (2013.01); *C08L 97/02* (2013.01)

(58) Field of Classification Search
CPC ............ C08L 61/12; C07G 1/00; C08H 6/00; C08H 8/00
USPC ............................................... 524/73
See application file for complete search history.

(56) References Cited

U.S. PATENT DOCUMENTS 2,934,531 A * 4/1960 Gardon et al. ................. 530/500
3,546,199 A * 12/1970 Look et al. .................... 530/500
(Continued)

FOREIGN PATENT DOCUMENTS

CA     2214013      *  7/1997  ............. C08L 97/00
CA     2597135 A1     9/2008
(Continued)

OTHER PUBLICATIONS

Lignins as Marcomonomers for Polyurethane Synthesis Cateto et al. J. of Applied Polymer Science, vol. 109, 3009-3017, 2008.*
(Continued)

*Primary Examiner* — John Uselding
(74) *Attorney, Agent, or Firm* — Perkins Coie LLP; Viola T. Kung

(57) ABSTRACT

The present invention provides derivatives of native lignin having an ethoxy content of 0.45 mmol/g or greater. Surprisingly, it has been found that phenolic resins comprising derivatives of native lignin having ethoxy contents have acceptable performance characteristics such as bondstrength.

14 Claims, 3 Drawing Sheets

(51) Int. Cl.
C07G 1/00 (2011.01)
C08H 7/00 (2011.01)
C08H 8/00 (2010.01)
C08L 61/06 (2006.01)
C08L 1/10 (2006.01)
C08L 97/02 (2006.01)

(56) References Cited

U.S. PATENT DOCUMENTS

| | | | |
|---|---|---|---|
| 3,585,104 A * | 6/1971 | Kleinert | 162/17 |
| 4,764,596 A | 8/1988 | Lora et al. | |
| 4,918,167 A * | 4/1990 | Glasser et al. | 530/502 |
| 5,173,527 A | 12/1992 | Calve | |
| 5,196,460 A | 3/1993 | Lora et al. | |
| 5,382,608 A * | 1/1995 | Gardzielia et al. | 524/14 |
| 5,681,427 A | 10/1997 | Lora et al. | |
| 6,555,350 B2 | 4/2003 | Ahring et al. | |
| 7,465,791 B1 | 12/2008 | Hallberg et al. | |
| 8,288,460 B2 * | 10/2012 | Balakshin et al. | 524/13 |
| 8,378,020 B1 | 2/2013 | Balakshin et al. | |
| 8,426,502 B2 * | 4/2013 | Balakshin et al. | 524/76 |
| 8,431,635 B2 * | 4/2013 | Balakshin et al. | 524/76 |
| 8,445,562 B2 * | 5/2013 | Balakshin et al. | 524/13 |
| 2008/0021155 A1 * | 1/2008 | Bono et al. | 525/54.42 |
| 2009/0069550 A1 * | 3/2009 | Belanger et al. | 530/507 |
| 2009/0117226 A1 | 5/2009 | Hallberg et al. | |
| 2010/0305242 A1 | 12/2010 | Balakshin et al. | |
| 2010/0305243 A1 | 12/2010 | Balakshin et al. | |
| 2010/0305244 A1 | 12/2010 | Balakshin et al. | |
| 2011/0236946 A1 | 9/2011 | Maclachlan et al. | |
| 2012/0136097 A1 | 5/2012 | Berlin | |
| 2012/0247617 A1 | 10/2012 | Berlin et al. | |
| 2014/0346395 A1 | 11/2014 | Balakshin et al. | |

FOREIGN PATENT DOCUMENTS

| | | |
|---|---|---|
| CN | 1766000 A | 5/2006 |
| CN | 101711229 A | 5/2010 |
| CN | 101711263 A | 5/2010 |
| EP | 0105937 A1 | 4/1984 |
| EP | 0737253 A1 | 10/1996 |
| EP | 2150572 A1 | 2/2010 |
| EP | 2173889 A1 | 4/2010 |
| WO | 9315261 A1 | 8/1993 |
| WO | 2007129921 A1 | 11/2007 |
| WO | WO-2008144878 A1 | 12/2008 |
| WO | WO-2008144903 A1 | 12/2008 |
| WO | WO-2009003292 A1 | 1/2009 |
| WO | 2009028969 A1 | 3/2009 |
| WO | WO-2010060183 A1 | 6/2010 |
| WO | WO-2010081231 A1 | 7/2010 |

OTHER PUBLICATIONS

Structural Analysis of Wheat Straw Lignin. Crestini et al. J. Agric. Food Chem. 1997, 45, 1212-1219.*
Meier et al. On Properties and Degradability of Lignins, Isolated with Alcohol-Water Mixtures. Holzforschung vol. 35 (1981), Part 5, p. 247-252.*
English translation of Holzforschung vol. 35 (1981), Part 5, p. 247-252.*
U.S. Appl. No. 12/602,036, filed Nov. 25, 2009, Maclachlan et al.
U.S. Appl. No. 12/789,366, filed May 27, 2010, Balakshin et al.
International Search Report for PCT/CA2008/001001, Filed on May 23, 2008, Applicant: Lignol Innovations Ltd. et al., Date of Mailing: Aug. 8, 2008, 4 pages.
International Search Report for PCT/CA2010/000205, Filed on Feb. 15, 2010, Applicant: Lignol Innovations Ltd. et al., Date of Mailing: Jun. 1, 2010, 5 pages.
International Search Report for PCT/CA2010/000209, Filed on Feb. 15, 2010, Applicant: Lignol Innovations Ltd. et al., Date of Mailing: May 14, 2010, 4 pages.
International Search Report for PCT/CA2010/000210, Filed on Feb. 15, 2010, Applicant: Lignol Innovations Ltd. et al., Date of Mailing: May 31, 2010, 4 pages.
International Search Report for PCT/CA2010/000800, Filed on May 27, 2010, Applicant: Lignol Innovations Ltd. et al., Date of Mailing: Sep. 3, 2010, 3 pages.
Argyropoulos, D.S. et al., "Isolation of Residual Kraft Lignin in High Yield and Purity," Journal of Pulp and Paper Science 2002, 28, 2, pp. 50-54.
Arlt Jr., HG et al., "Lignin Structure. VIII. Characterization of Ethanol Spruce Lignin Prepared by a New Method"; J. Am. Chem. Soc.; vol. 78, No. 9, pp. 1904-1906 (1956).
Asgari, F. et al., "Fundamentals of oxygen delignification. Part II. Functional group formation/elimination in residual kraft lignin," Can. J. Chem. 1998, 76, pp. 1606-1615.
Catignani, G.L. et al., "Antioxidant Properties of Lignin," Journal of Food Science 1982, vol. 47, 2 pages.
Chakar, F.S. et al., "Biobleaching chemistry of laccase-mediator systems on high-lignin-content kraft pulps," Can. J. Chem. 2004, 82, pp. 344-352.
Chakar, F.S. et al., "Laccase-Lignin Reactions," IPST Technical Paper Series No. 876, Institute of Paper Science and Technology, Aug. 2000, 6 pages.
Colodette, J.L. et al., "Influence of pulping conditions on eucalyptus kraft pulp yield, quality, and bleachability," TAPPI Journal 2002, pp. 14-20.
Dizhbite, T. et al., "Characterization of the radical scavenging activity of lignins—natural antioxidants," Bioresource Technology 2004, 95, pp. 309-317.
Froass, P.M. et al., "Nuclear Magnetic Resonance Studies. 4. Analysis of Residual Lignin after Kraft Pulping," Ind. Eng. Chem. Res. 1998, 37, pp. 3388-3394.
Gellerstedt. G. et al., "Chemical Structures Present in Biofuel Obtained from Lignin," Energy & Fuels 2008, 22, pp. 4240-4244.
Gregorova, A. et al., "Stabilization effect of lignin in polypropylene and recycled polypropylene," Polymer Degradation and Stability 2005, 89, pp. 553-558.
Jaaskelainen, A.S. et al., "The effect of isolation method on the chemical structure of residual lignin," Wood Sci Technol 2003, 37, pp. 91-102.
Kasprzycka-Guttman, T., et al., "Antioxidant properties of lignin and its fractions," Thermochimica Acta 1994, 231, pp. 161-168.
Kosikova, B. et al., "Lignin-Stimulated Protection of Polypropylene Films and DNA in Cells of Mice against Oxidation Damage," BioResources May 2009, 4(2), pp. 805-815.
Kubo, S. et al., "Hydrogen Bonding in Lignin: A Fourier Transform Infrared Model Compound Study," Biomacromolecules 2005, 6, pp. 2815-2821.
Kubo, S. et al., "Kraft Lignin/Poly (ethylene oxide) Blends: Effect of Lignin Structure on Miscibility and Hydrogen Bonding," Journal of Applied Polymer Science 2005, 98, pp. 1437-1444.
Kubo, S. et al., "Poly (Ethylene Oxide)/ Organosolv Lignin Blends: Relationship between Thermal properties, Chemical Structure, and Blend Behaviour"; Macromolecules; vol. 37, pp. 6904-6911 (2004).
Lucia, L.A. et al., "Comparative Evaluation of Oxygen Delignification Processes for Low- and High-Lignin-Content Softwood Kraft Pulps," Ind. Eng. Chem. Res. 2002, 41, pp. 5171-5180.
Megiatto, J.D. et al., "Sisal Fibers: Surface Chemical Modification Using Reagent Obtained from a Renewable Source; Characterization of Hemicellulose and Lignin as Model Study," J. Agric. Food Chem. 2007, 55, pp. 8576-8584.
Nieminen, M.O.J. et al., "Determination of Hydroxyl Groups in Kraft Pine Lignin by Silicon-29 NMR Spectroscopy," Holzforschung 1989, 43, pp. 303-307.
Pan et al., "Biorefining of Sotwoods Using Ethanol Organosolv Pulping"; Biotechnology and Bioengineering; vol. 90, No. 4 (May 20, 2005).
Pan et al., "Organosolv Ethanol Lignin from Hybrid Poplar as a Radical Scavenger: Relationship between Lignin Structure, Extraction Conditions, and Antioxidant Activity," J. Agric. Food Chem., 2006, 54, 5806-5813.

(56) References Cited

OTHER PUBLICATIONS

Pu, Y. et al., "Investigation of the photo-oxidative chemistry of acetylated softwood lignin," Journal of Photochemistry and Photobiology: A Chemistry 163, 2004, pp. 215-221.

Pu, Y. et al., "Structural analysis of acetylated hardwood lignins and their photoyellowing properties," Can. J. Chem. 2005, 83, pp. 2132-2139.

Sealey, J et al., "Residual Lignin Studies of Laccase Delignified Kraft Pulps," IPST Technical Paper Series, No. 621, Institute of Paper Science and Technology, Aug. 1996, 7 pages.

Tohmura, Shin-ichiro et al., "Determination of Arylglycerol-β-aryl Ethers and Other Linkages in Lignins Using DFRC/31P NMR," J. Agric. Food Chem. 2001, 49, pp. 536-542.

Vinardell, M.P. et al., "Potential applications of antioxidant lignins from different sources," Industrial Crops and Products 2008, pp. 220-223.

Wu, S. et al., "An Improved Method for Isolating Lignin in High Yield and Purity," Journal of Pulp and Paper Science 2003, July, vol. 29, No. 7, pp. 235-240.

Yang, R. et al., "Oxygen Degradation and Spectroscopic Characterization of Hardwood Kraft Lignin," Ind. Eng. Chem. Res. 2002, 41, pp. 5941-5948.

Zawadzki, M. et al., "N-Hydroxy Compounds as New Internal Standards for the 31P-NMR Determination of Lignin Hydroxy Functional Groups," Holzforschung 2001, 55, 3, pp. 283-285.

Arlt, H.G. Jr., et al. "Lignin Structure. VIII. Characterization of Ethanol Spruce Lignin Prepared by a New Method", Journal of the American Chemical Society, 1956, vol. 78, Issue 9, pp. 1904-1906.

Enoki, A. et al. "Degredation of the Lignin Model Compounds 4-Ethoxy-3METHOXYPHENYLGLYCOL 3-Guaiacyl and Vanillic Acid Ethers by Phanerochaete Chrysosporium", FEMS Microbiology Letters 10, 1981, p. 373.

Gregorova, A. et al. "Radical Scavenging Capacity of Lignin and Its Effect on Processing Stabilization of Virgin and Recycled Polypropylene", Journal of Applied Polymer Science, 2007, vol. 106, Issue 3, pp. 1626-1631.

\* cited by examiner

RESIN COMPOSITIONS COMPRISING LIGNIN DERIVATIVES

This application is a national stage of International Application PCT/CA2010/000800, filed May 27, 2010, published Dec. 2, 2010, under PCT Article 21(2) in English; which claims the priority of U.S. Provisional Patent Application Nos. 61/182,044, filed May 28, 2009; 61/233,345, filed Aug. 12, 2009; and 61/304,745, filed Feb. 15, 2010, the contents of the above applications are incorporated herein by reference in their entirety.

FIELD

This invention relates to derivatives of native lignin recovered from lignocellulosic feedstocks, and industrial applications thereof. More particularly, this invention relates to compositions, uses, processes and methods utilizing derivatives of native lignin.

BACKGROUND

Native lignin is a naturally occurring amorphous complex cross-linked organic macromolecule that comprises an integral component of all plant biomass. The chemical structure of lignin is irregular in the sense that different structural units (e.g., phenylpropane units) are not linked to each other in any systematic order. It is known that native lignin comprises pluralities of two monolignol monomers that are methoxylated to various degrees (trans-coniferyl alcohol and trans-sinapyl alcohol) and a third non-methoxylated monolignol (trans-p-coumaryl alcohol). Various combinations of these monolignols comprise three building blocks of phenylpropanoid structures i.e. guaiacyl monolignol, syringyl monolignol and p-hydroxyphenyl monolignol, respectively, that are polymerized via specific linkages to form the native lignin macromolecule.

Extracting native lignin from lignocellulosic biomass during pulping generally results in lignin fragmentation into numerous mixtures of irregular components. Furthermore, the lignin fragments may react with any chemicals employed in the pulping process. Consequently, the generated lignin fractions can be referred to as lignin derivatives and/or technical lignins. As it is difficult to elucidate and characterize such complex mixture of molecules, lignin derivatives are usually described in terms of the lignocellulosic plant material used, and the methods by which they are generated and recovered from lignocellulosic plant material, i.e. hardwood lignins, softwood lignins, and annual fibre lignins.

Native lignins are partially depolymerized during the pulping processes into lignin fragments which are soluble in the pulping liquors and subsequently separated from the cellulosic pulps. Post-pulping liquors containing lignin and polysaccharide fragments, and extractives, are commonly referred to as "black liquors" or "spent liquors", depending on the pulping process. Such liquors are generally considered a by-product, and it is common practice to combust them to recover some energy value in addition to recovering the cooking chemicals. However, it is also possible to precipitate and/or recover lignin derivatives from these liquors. Each type of pulping process used to separate cellulosic pulps from other lignocellulosic components produces lignin derivatives that are very different in their physico-chemical, biochemical, and structural properties.

Given that lignin derivatives are available from renewable biomass sources there is an interest in using these derivatives in certain industrial processes. For example, U.S. Pat. No. 5,173,527 proposes using lignin-cellulosic materials in phenol-formaldehyde resins. A. Gregorova et al. propose using lignin in blends or alloys with polypropylene for its radical scavenging properties (A. Gregorova et al, Radical scavenging capacity of lignin and its effect on processing stabilization of virgin and recycled polypropylene, Journal of Applied Polymer Science 106-3 (2007) pp. 1626-1631). However, large-scale commercial application of the extracted lignin derivatives, particularly those isolated in traditional pulping processes employed in the manufacture of pulp and paper, has been limited due to, for example, the inconsistency of their chemical and functional properties. This inconsistency may, for example, be due to changes in feedstock supplies and the particular extraction/generation/recovery conditions. These issues are further complicated by the complexity of the molecular structures of lignin derivatives produced by the various extraction methods and the difficulty in performing reliable routine analyses of the structural conformity and integrity of recovered lignin derivatives.

Formaldehyde-based resins such as phenol formaldehyde (PF), urea formaldehyde and melamine formaldehyde are extremely common and used for a variety of purposes such as manufacturing of housing and furniture panels such as medium density fiberboard (MDF), oriented strand board (OSB), plywood, and particleboard. Concerns about the toxicity of formaldehyde have led regulatory authorities to mandate the reduction of formaldehyde emissions (e.g. California Environmental Protection Agency Airborne Toxic Control Measure (ATCM) to Reduce Formaldehyde Emissions from Composite Wood Products, Apr. $26^{th}$, 2007).

The addition of phenol-free and formaldehyde-free compositions, such as sulphur-free lignin derivatives, represents a viable alternative to the toxic chemicals. However, past attempts at adding lignin derivatives, such as Alcell® lignin, to PF resins have been largely unsuccessful due to the relatively poor performance characteristics of the final product. For example, the normalized Alcell® lignin-PF resin bond strength at 150° C. was 3,079 MPa*cm$^2$/g as tested by the ABES method (Wescott, J. M., Birkeland, M. J., Traska, A. E., New Method for Rapid Testing of Bond Strength for Wood Adhesives, Heartland Resource Technologies Waunakee, Wis., U.S.A. and Frihart, C. R. and Dally, B. N., USDA Forest Service, Forest Products Laboratory, Madison, Wis., U.S.A., Proceedings $30^{th}$ Annual Meeting of The Adhesion Society, Inc., Feb. 18-21, 2007, Tampa Bay, Fla., USA). These values are significantly lower than what is commonly expected for instance for plywood or OSB PF resins (3,200-3,600 MPa*cm$^2$/g).

SUMMARY

The present invention provides derivatives of native lignin having a certain ethoxy content. Surprisingly, it has been found that phenolic resins comprising derivatives of native lignin having certain ethoxy contents have acceptable performance characteristics such as bondstrength.

As used herein, the term "native lignin" refers to lignin in its natural state, in plant material.

As used herein, the terms "lignin derivatives" and "derivatives of native lignin" refer to lignin material extracted from lignocellulosic biomass. Usually, such material will be a mixture of chemical compounds that are generated during the extraction process.

This summary does not necessarily describe all features of the invention. Other aspects, features and advantages of the

DETAILED DESCRIPTION

Figure 1:
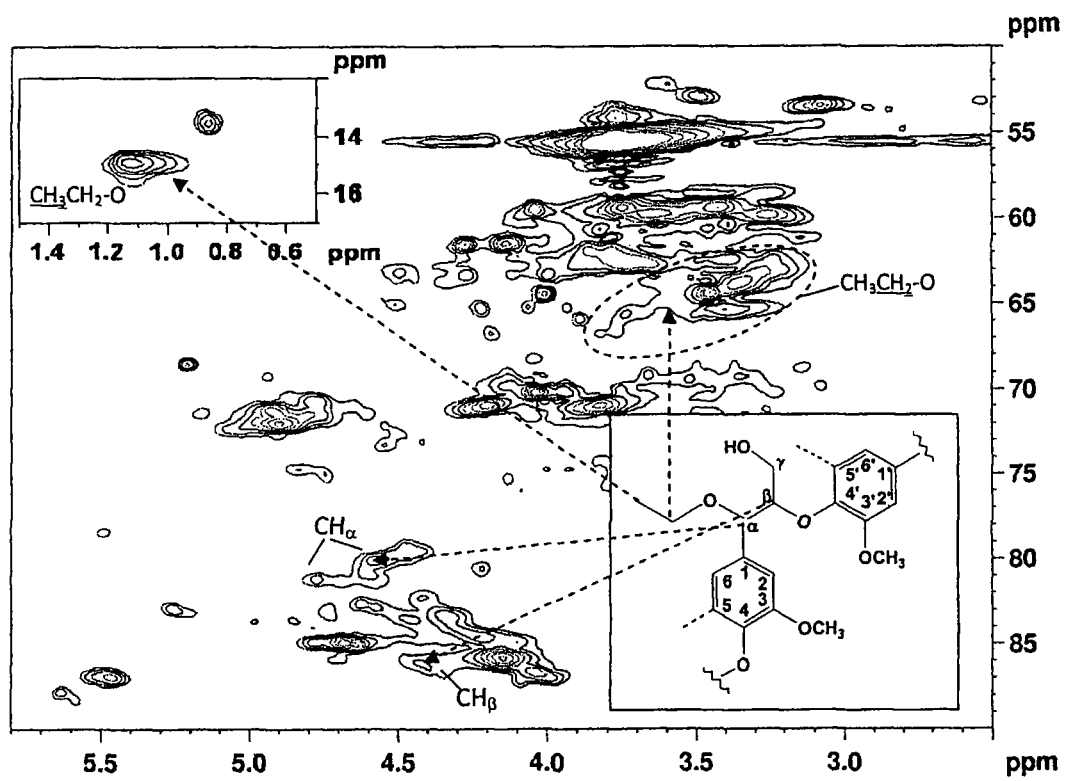
FIG. 1 shows the HSQC spectrum of non-acetylated hardwood lignin derivatives (arrows indicate the signals corresponding to the ethoxyl groups).
Figure 2:
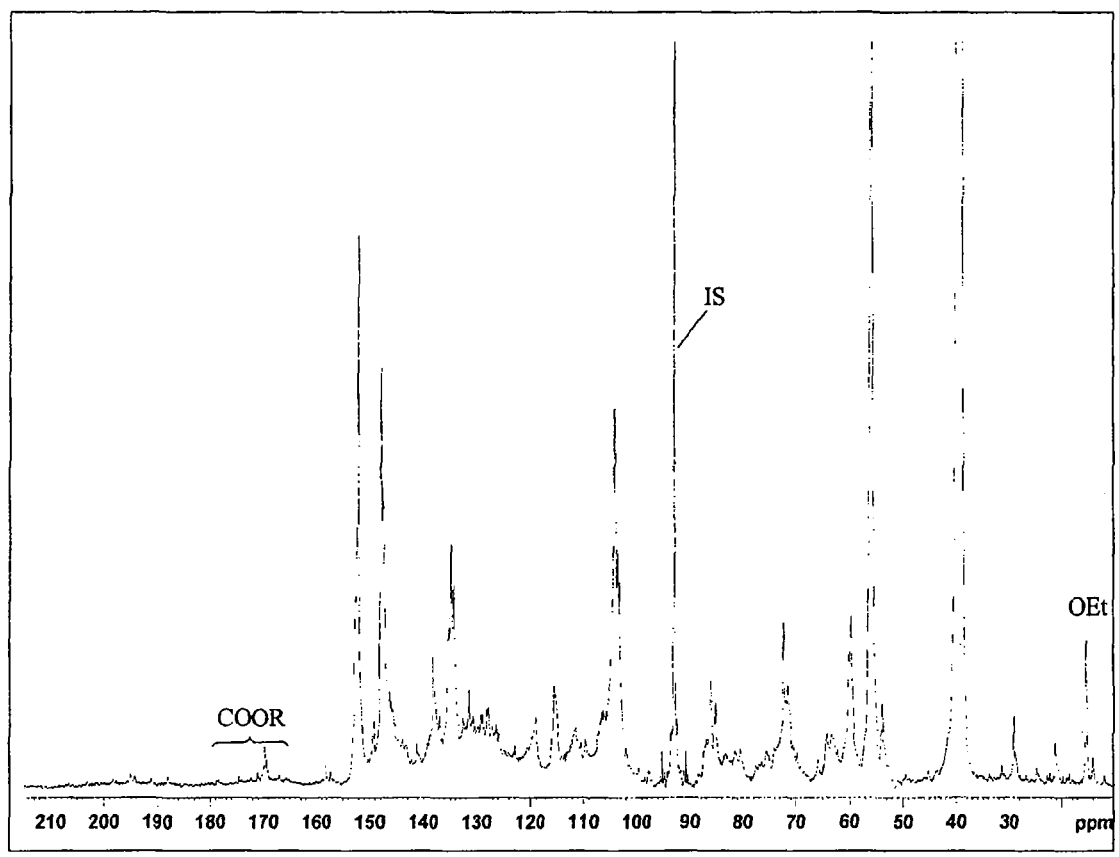
FIG. 2 shows the quantitative $^{13}$C NMR spectrum of non-acetylated hardwood lignin derivatives.
Figure 3:
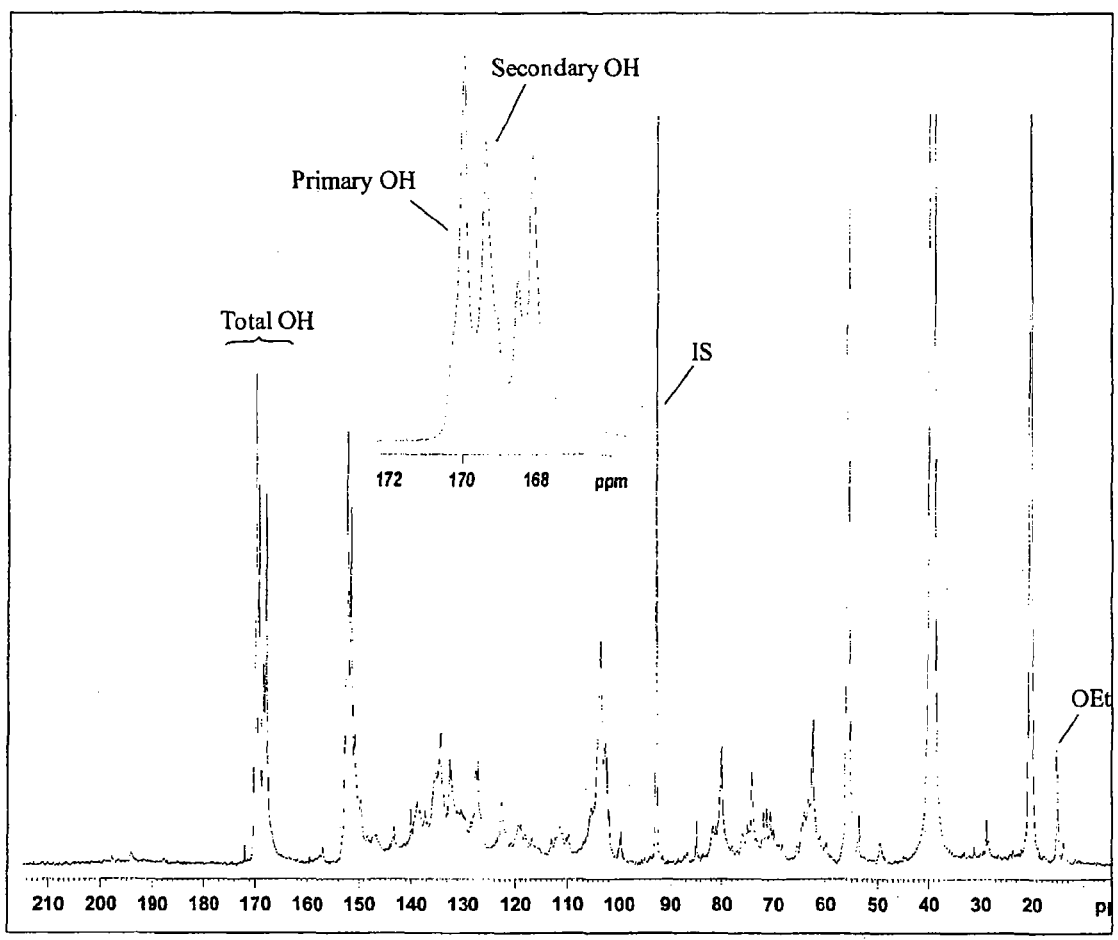
FIG. 3 shows the quantitative $^{13}$C NMR spectrum of acetylated hardwood lignin derivatives.

The present invention provides derivatives of native lignin having certain ethoxy contents. Phenol-formaldehyde (PF) resins comprising lignin derivatives having higher ethoxy contents have been found to have acceptable bond-strengths. Thus, selecting for derivatives of native lignin having a higher ethoxy content results in a product having better performance characteristics. It has been found that derivatives of native lignin having an ethoxy content of 0.45 mmol/g or greater result in PF-resins having acceptable bond-strengths. For example, about 0.5 mmol/g or greater; about 0.6 mmol/g or greater; about 0.7 mmol/g or greater; about 0.8 mmol/g or greater; about 0.9 mmol/g or greater; about 1 mmol/g or greater; about 1.1 mmol/g or greater; about 1.2 mmol/g or greater.

The present lignin derivatives may, for example, have an ethoxy content of about 3.75 mmol/g or less; 3.5 mmol/g or less; 3.25 mmol/g or less; 3 mmol/g or less; 2.75 mmol/g or less; 2.5 mmol/g or less; 2.25 mmol/g or less; 2 mmol/g or less; 1.9 mmol/g or less; 1.8 mmol/g or less; 1.7 mmol/g or less; 1.6 mmol/g or less; 1.5 mmol/g or less; 1.4 mmol/g or less; 1.3 mmol/g or less.

The lignin derivatives may comprise other alkoxy groups apart from ethoxy groups such as $C_1$-$C_6$ alkoxy groups; $C_1$-$C_4$ alkoxy groups; $C_1$-$C_3$ alkoxy groups; methoxy and/or propoxy.

Quantification of the alkoxy groups can be performed using high resolution $^{13}$C NMR spectroscopy. For example, quantification of ethoxyl groups can be performed by high resolution $^{13}$C NMR spectroscopy. Identification of ethoxyl groups can be confirmed by 2D NMR HSQC spectroscopy. 2D NMR spectra may be recorded by a Bruker 700 MHz UltraShield Plus standard bore magnet spectrometer equipped with a sensitive cryogenically cooled 5 mm TCI gradient probe with inverse geometry. The acquisition parameters are the following: standard Bruker pulse program hsqcetgp, temperature of 298 K, a 90° pulse, 1.1 sec pulse delay (d1), and acquisition time of 60 msec.

The present invention provides derivatives of native lignin recovered during or after pulping of lignocellulosic biomass feedstocks. The pulp may be from any suitable lignocellulosic feedstock including hardwoods, softwoods, annual fibres, and combinations thereof.

Hardwood feedstocks include *Acacia*; *Afzelia*; *Synsepalum duloilicum*; *Albizia*; Alder (e.g. *Alnus glutinosa, Alnus rubra*); Applewood; Arbutus; Ash (e.g. *F. nigra, F. quadrangulata, F. excelsior, F. pennsylvanica lanceolata, F. latifolia, F. profunda, F. americana*); Aspen (e.g. *P. grandidentata, P. tremula, P. tremuloides*); Australian Red Cedar (*Toona tiliata*); Ayna (*Distemonanthus benthamianus*); Balsa (*Ochroma pyramidale*); Basswood (e.g. *T. americana, T. heterophylla*); Beech (e.g. *F. sylvatica, F. grandifolia*); Birch; (e.g. *Betula populfolia, B. nigra, B. papyrifera, B. lenta, B. alleghaniensis/B. lutea, B. pendula, B. pubescens*); Blackbean; Blackwood; Bocote; Boxelder; Boxwood; Brazilwood; Bubinga; Buckeye (e.g. *Aesculus hippocastanum, Aesculus glabra, Aesculus flava/Aesculus octandra*); Butternut; Catalpa; Cherry (e.g. *Prunus serotina, Prunus pennglvanica, Prunus avium*); Crabwood; Chestnut; Coachwood; Cocobolo; Corkwood; Cottonwood (e.g. *Populus balsamifera, Populus deltoides, Populus sargentii, Populus heterophylla*); Cucumbertree; Dogwood (e.g. *Cornus florida, Cornus nuttallii*); Ebony (e.g. *Dioipyros kurzii, Diospyros melanida, Diosipyros crassiflora*); Elm (e.g. *Ulmus americana, Ulmus procera, Ulmus thomasii, Ulmus rubra, Ulmus glabra*); Eucalyptus; Greenheart; Grenadilla; Gum (e.g. *Nyssa sylvatica, Eucalyptus globulus, Liquidambar styracifula, Nyssa aquatica*); Hickory (e.g. *Carya alba, Carya glabra, Carya ovata, Carya laciniosa*); Hornbeam; Hophornbeam; Ipê; Iroko; Ironwood (e.g. Bangkirai, *Carpinus caroliniana, Casuarina equisetifolia, Choricbangarpia subargentea, Copaifera* spp., *Eusideroxylon zwageri, Guajacum officinale, Guajacum sanctum, Hopea odorata*, Ipe, *Krugiodendron ferreum, Lyonothamnus lyonii* (*L. floribundus*), *Mesua ferrea, Olea* spp., *Olneya tesota, Ostga virginiana, Parrotia persica, Tabebuia serratifolia*); Jacarandá; Jotoba; Lacewood; Laurel; Limba; Lignum vitae; Locust (e.g. *Robinia pseudacacia, Gleditsia triacanthos*); Mahogany; Maple (e.g. *Acer saccharum, Acer nigrum, Acer negundo, Acer rubrum, Acer saccharinum, Acer pseudoplatanus*); Meranti; Mpingo; Oak (e.g. *Quercus macrocarpa, Quercus alba, Quercus stellata, Quercus bicolor, Quercus virginiana, Quercus michauxii, Quercus prinus, Quercus muhlenbergii, Quercus chysolepris, Quercus lyrata, Quercus robur, Quercus petraea, Quercus rubra, Quercus velutina, Quercus laurifolia, Quercus jalcata, Quercus nigra, Quercus phellos, Quercus texana*); Obeche; Okoumé; Oregon Myrtle; California Bay Laurel; Pear; Poplar (e.g. *P. balsamifera, P. nigra*, Hybrid Poplar (*Populus×canadensis*)); Ramin; Red cedar; Rosewood; Sal; Sandalwood; Sassafras; Satinwood; Silky Oak; Silver Wattle; Snakewood; Sourwood; Spanish cedar; American sycamore; Teak; Walnut (e.g. *Juglans nigra, Juglans regia*); Willow (e.g. *Salix nigra, Salix alba*); Yellow poplar (*Liriodendron tulipifera*); Bamboo; Palmwood; and combinations/hybrids thereof.

For example, hardwood feedstocks for the present invention may be selected from *acacia*, aspen, beech, *eucalyptus*, maple, birch, gum, oak, poplar, and combinations/hybrids thereof. The hardwood feedstocks for the present invention may be selected from *Populus* spp. (e.g. *Populus tremuloides*), *Eucalyptus* spp. (e.g. *Eucalyptus globulus*), *Acacia* spp. (e.g. *Acacia dealbata*), and combinations/hybrids thereof.

The present invention provides lignin derivatives from hardwood biomass wherein the derivatives have an ethoxy content, of from 0.45 mmol/g to about 1.4 mmol/g; about 0.5 mmol/g to about 1.3 mmol/g; about 0.6 mmol/g to about 1.2 mmol/g.

Softwood feedstocks include Araucaria (e.g. *A. cunninghamii, A. angustifolia, A. araucana*); softwood Cedar (e.g. *Juniperus virginiana, Thuja plicata, Thuja occidentalis, Chamaecyparis thyoides Callitropsis nootkatensis*); Cypress (e.g. *Chamaetyparis, Cupressus Taxodium, Cupressus arizonica, Taxodium distichum, Chamaecypenis obtusa, Chamaeoparis lawsoniana, Cupressus semperviren*); Rocky Mountain Douglas fir; European Yew; Fir (e.g. *Abies balsamea, Abies alba, Abies procera, Abies amabilis*); Hemlock (e.g. *Tsuga canadensis, Tsuga mertensiana, Tsuga heterophylla*); Kauri; Kaya; Larch (e.g. *Larix decidua, Larix kaempferi, Larix laricina, Larix occidentalis*); Pine (e.g.

*Pinus nigra, Pinus banksiana, Pinus contorta, Pinus radiata, Pinus ponderosa, Pinus resinosa, Pinus sylvestris, Pinus strobus, Pinus monticola, Pinus lambertiana, Pinus taeda, Pinus palustris, Pinus rigida, Pinus echinata*); Redwood; Rimu; Spruce (e.g. *Picea abies, Picea mariana, Picea rubens, Picea sitchensis, Picea glauca*); Sugi; and combinations/hybrids thereof.

For example, softwood feedstocks which may be used herein include cedar; fir; pine; spruce; and combinations thereof. The softwood feedstocks for the present invention may be selected from loblolly pine (*Pinus taeda*), radiata pine, jack pine, spruce (e.g., white, interior, black), Douglas fir, *Pinus silvestris, Picea abies*, and combinations/hybrids thereof. The softwood feedstocks for the present invention may be selected from pine (e.g. *Pinus radiata, Pinus taeda*); spruce; and combinations/hybrids thereof.

The present invention provides lignin derivatives from softwood biomass wherein the derivatives have an ethoxy content, of from about 0.35 mmol/g to about 1.4 mmol/g; about 0.45 mmol/g to about 1.3 mmol/g; about 0.5 mmol/g to about 1.2 mmol/g; about 0.6 mmol/g to about 1.1 mmol/g.

Annual fibre feedstocks include biomass derived from annual plants, plants which complete their growth in one growing season and therefore must be planted yearly. Examples of annual fibres include: flax, cereal straw (wheat, barley, oats), sugarcane bagasse, rice straw, corn stover, corn cobs, hemp, fruit pulp, alfa grass, switchgrass, and combinations/hybrids thereof. Industrial residues like corn cobs, corn fibre, distillers' dried grains (DDGs), fruit peals, seeds, etc. may also be considered annual fibres since they are commonly derived from annual fibre biomass such as edible crops and fruits. For example, the annual fibre feedstock may be selected from wheat straw, corn stover, corn cobs, sugar cane bagasse, and combinations/hybrids thereof.

The present invention provides lignin derivatives from annual fibre biomass wherein the derivatives have an ethoxy content, of from about 0.25 mmol/g to about 1.4 mmol/g; about 0.35 mmol/g to about 1.3 mmol/g; about 0.45 mmol/g to about 1.2 mmol/g; about 0.5 mmol/g to about 1.1 mmol/g.

The derivatives of native lignin will vary with the type of process used to separate native lignins from cellulose and other biomass constituents. Any suitable process may be used herein but it should be noted that kraft pulping, sulphite pulping, and ASAM organosolv pulping will generate derivatives of native lignin containing significant amounts of organically-bound sulphur which may make them unsuitable for certain uses.

Organosolv processes, particularly the Alcell® process, tend to be less aggressive and can be used to separate highly purified lignin derivatives and other useful materials from biomass without excessively altering or damaging the native lignin building blocks. Such processes can therefore be used to maximize the value from all the components making up the biomass.

A description of the Alcell® process can be found in U.S. Pat. No. 4,764,596 (herein incorporated by reference). The process generally comprises pulping or pre-treating a fibrous biomass feedstock with primarily an ethanol/water solvent solution under conditions that include: (a) 60% ethanol/40% water, (b) temperature of about 180° C. to about 210° C., (c) pressure of about 20 atm to about 35 atm, and (d) a processing time of 5-120 minutes. Derivatives of native lignin are fractionated from the native lignins into the pulping liquor which also receives solubilised hemicellulases, other carbohydrates and other extractives such as resins, organic acids, phenols, and tannins. Organosolv pulping liquors comprising the fractionated derivatives of native lignin and other extractives from the fibrous biomass feedstocks, are often called "black liquors". The organic acid and extractives released by organosolv pulping significantly acidify the black liquors to pH levels of about 5 and lower. After separation from the cellulosic pulps produced during the pulping process, the derivatives of native lignin are recovered from the black liquors by by flashing (depressurization) followed by addition of the flashed black liquor to cold water which will cause the fractionated derivatives of native lignin to precipitate thereby enabling their recovery by standard solids/liquids separation processes. Various disclosures exemplified by U.S. Pat. No. 7,465,791 and PCT Patent Application Publication No. WO 2007/129921, describe modifications to the Alcell organosolv process for the purpose of increasing the yields of fractionated derivatives of native lignin recovered from fibrous biomass feedstocks during biorefining. Modifications to the Alcell organosolv process conditions included adjusting: (a) ethanol concentration in the pulping liquor to a value selected from a range of 35%-85% (w/w) ethanol, (b) temperature to a value selected from a range of 100° C. to 350° C., (c) pressure to a value selected from a range of 5 atm to 35 atm, and (d) processing time to a duration from a range of 20 minutes to about 2 hours or longer, (e) liquor-to-wood ratio of 3:1 to 15:1 or higher, (f) pH of the cooking liquor from a range of 1 to 6.5 or higher if a basic catalyst is used.

The present invention provides a process for producing derivatives of native lignin, said process comprising:

(a) pulping a fibrous biomass feedstock with an organic solvent/water solution, (b) separating the cellulosic pulps or pre-treated substrates from the pulping liquor or pre-treatment solution, (c) recovering derivatives of native lignin.

The organic solvent may be selected from short chain primary and secondary alcohols, such as such as methanol, ethanol, propanol, and combinations thereof. For example, the solvent may be ethanol. The liquor solution may comprise about 20%, by weight, or greater, about 30% or greater, about 50% or greater, about 60% or greater, about 70% or greater, of ethanol.

Step (a) of the process may be carried out at a temperature of from about 100° C. and greater, or about 120° C. and greater, or about 140° C. and greater, or about 160° C. and greater, or about 170° C. and greater, or about 180° C. and greater. The process may be carried out at a temperature of from about 300° C. and less, or about 280° C. and less, or about 260° C. and less, or about 240° C. and less, or about 220° C. and less, or about 210° C. and less, or about 205° C. and less, or about 200° C. and less.

Step (a) of the process may be carried out at a pressure of about 5 atm and greater, or about 10 atm and greater, or about 15 atm and greater, or about 20 atm and greater, or about 25 atm and greater, or about 30 atm and greater. The process may be carried out at a pressure of about 150 atm and less, or about 125 atm and less, or about 115 atm and less, or about 100 atm and less, or about 90 atm and less, or about 80 atm and less.

The fibrous biomass may be treated with the solvent solution of step (a) for about 1 minute or more, about 5 minutes or more, about 10 minutes or more, about 15 minutes or more, about 30 minutes or more. The fibrous biomass may be treated with the solvent solution of step (a) at its operating temperature for about 360 minutes or less, about 300 minutes or less, about 240 minutes or less, about 180 minutes or less, about 120 minutes or less.

The pH of the pulp liquor may, for example, be from about 1 to about 6, or from about 1.5 to about 5.5.

The weight ratio of liquor to biomass may be any suitable ratio. For example, from about 5:1 to about 15:1, from about 5.5:1 to about 10:1; from about 6:1 to about 8:1.

The present lignin derivatives may have any suitable phenolic hydroxyl content such as from about 2 mmol/g to about 8 mmol/g. For example, the phenolic hydroxyl content may be from about 2.5 mmol/g to about 7 mmol/g; about 3 mmol/g to about 6 mmol/g.

The present lignin derivatives may have any suitable number average molecular weight (Mn). For example, the Mn may be from about 200 g/mol to about 3000 g/mol; about 350 g/mol to about 2000 g/mol; about 500 g/mol to about 1500 g/mol.

The present lignin derivatives may have any suitable weight average molecular weight (Mw). For example, the Mw may be from about 500 g/mol to about 5000 g/mol; about 750 g/mol to about 4000 g/mol; about 900 g/mol to about 3500 g/mol.

The present lignin derivatives may have any suitable polydispersity (D). For example, the D may be from about 1 to about 5; from about 1.2 to about 4; from about 1.3 to about 3.5; from about 1.4 to about 3.

The present lignin derivatives are preferably hydrophobic. Hydrophobicity may be assessed using standard contact angle measurements. For example, a lignin pellet may be formed using a FTIR KBr pellet press. Then a water droplet is added onto the pellet surface and the contact angle between the water droplet and the lignin pellet is measured using a contact angle goniometer. As the hydrophobicity of lignins increases the contact angle also increases. Preferably the lignins herein will have a contact angle of about 90° or greater.

The lignin derivatives herein may, for example, have an aliphatic hydroxyl content of from about 0.001 mmol/g to about 8 mmol/g; about 0.1 mmol/g to about 7 mmol/g; about 0.2 mmol/g to about 6.5 mmol/g; about 0.4 mmol/g to about 6 mmol/g.

The present invention provides a process for producing a lignin derivative having an ethoxy content of 0.45 mmol/g or greater result, said process comprising:
a) pulping or pre-treating a fibrous biomass feedstock in a vessel with an organic solvent/water solvent solution to form a liquor, wherein:
  i. the solution comprises about 30% or greater, by weight, of organic solvent; and
  ii. the pH of the liquor is from about 1 to about 6;
b) heating the liquor to about 100° C. or greater;
c) maintaining the elevated temperature for 1 minute or longer;
d) separating the cellulosic pulps from the pulp liquor
e) recovering derivatives of native lignin.

The present invention provides a process for producing a hardwood lignin derivative having an ethoxy content of 0.45 mmol/g or greater result, said process comprising:
a) pulping or pre-treating a fibrous feedstock comprising hardwood biomass in a vessel with an organic solvent/water solvent solution to form a liquor, wherein:
  i. the solution comprises about 30% or greater, by weight, of organic solvent; and
  ii. the pH of the liquor is from about 1 to about 6;
b) heating the liquor to about 100° C. or greater;
c) maintaining the elevated temperature for 1 minute or longer;
d) separating the cellulosic pulps from the pulp liquor
e) recovering derivatives of native lignin.

The present invention provides a process for producing a softwood lignin derivative having an ethoxy content of 0.35 mmol/g or greater result, said process comprising:
a) pulping or pre-treating a fibrous feedstock comprising softwood biomass in a vessel with an organic solvent/water solvent solution to form a liquor, wherein:
  i. the solution comprises about 30% or greater, by weight, of organic solvent; and
  ii. the pH of the liquor is from about 1 to about 6;
b) heating the liquor to about 100° C. or greater;
c) maintaining the elevated temperature for 1 minute or longer;
d) separating the cellulosic pulps from the pulp liquor
e) recovering derivatives of native lignin.

The present invention provides a process for producing a annual fibre lignin derivative having an ethoxy content of 0.25 mmol/g or greater result, said process comprising:
a) pulping or pre-treating a fibrous feedstock comprising annual fibre biomass in a vessel with an organic solvent/water solvent solution to form a liquor, wherein:
  i. the solution comprises about 30% or greater, by weight, of organic solvent; and
  ii. the pH of the liquor is from about 1 to about 5.5;
b) heating the liquor to about 100° C. or greater;
c) maintaining the elevated temperature and pressure for 1 minute or longer;
d) separating the cellulosic pulps from the pulp liquor
e) recovering derivatives of native lignin.

The derivatives of native lignin herein may be incorporated into resin compositions as epoxy resins, urea-formaldehyde resins, phenol-formaldehyde resins, polyimides, isocyanate resins, and the like. The lignin derivatives herein are particularly useful in phenolic resins.

Phenol-formaldehyde resins can be produced by reacting a molar excess of phenol with formaldehyde in the presence of an acid catalyst, such as sulfuric acid, hydrochloric acid or, oxalic acid (usually in an amount of 0.2 to 2% by weight based on the phenol) or a basic catalyst such as sodium hydroxide. To prepare the so-called "high ortho" novolac resins, the strong acid catalyst is typically replaced by a divalent metal oxide (e.g. MgO and ZnO) or an organic acid salt of a divalent metal (e.g. zinc acetate or magnesium acetate) catalyst system. The resins so-produced are thermoplastic, i.e., they are not self-crosslinkable. Such novolac resins are converted to cured resins by, for example, reacting them under heat with a crosslinking agent, such as hexamine (also called hexa or hexamethylenetetramine), or for example, by mixing them with a solid acid catalyst and paraformaldehyde and reacting them under heat. Novolac resins also may be cured with other cross linkers such as resoles and epoxies.

The lignin derivative may be mixed with phenol at any suitable ratio. For example, a lignin:phenol weight ratio of about 1:10 to about 10:1, about 1:8 to about 8:1, about 1:6 to about 6:1, about 1:5 to about 5:1, about 1:4 to about 4:1, about 1:3 to about 3:1, about 1:2 to about 2:1, about 1:1.

The lignin derivative may comprise any suitable amount of the total resin composition. For example, from about 0.1%, by weight, or greater, about 0.5% or greater, about 1% or greater, of the total resin composition. The lignin derivative may comprise from about 80%, by weight, or less, about 60% or less, about 40% or less, about 20% or less, about 10% or less, of the total resin composition.

The compositions may comprise a variety of other optional ingredients such as adhesion promoters; biocides (e.g. bactericides, fungicides, and moldicides), anti-fogging agents; anti-static agents; bonding, blowing and foaming agents; dispersants; fillers and extenders; fire and flame retardants and smoke suppressants; impact modifiers; initiators; lubricants; micas; pigments, colorants and dyes; plasticizers; processing aids; release agents; silanes, titanates and zirconates; slip and anti-blocking agents; stabilizers; stearates; ultraviolet light absorbers; foaming agents; defoamers; hardeners; odorants; deodorants; antifouling agents; viscosity regulators; waxes; and combinations thereof.

The present derivatives may be used for other purposes such as, for example, laminates, stains, pigments, inks, adhesives, coatings, rubbers, elastomers, plastics, films, paints, carbon fibre composites, panel boards, print-circuit boards, lubricants, surfactants, oils, animal feed, food and beverages, and the like.

All citations are herein incorporated by reference, as if each individual publication was specifically and individually indicated to be incorporated by reference herein and as though it were fully set forth herein. Citation of references herein is not to be construed nor considered as an admission that such references are prior art to the present invention.

One or more currently preferred embodiments of the invention have been described by way of example. The invention includes all embodiments, modifications and variations substantially as hereinbefore described and with reference to the examples and figures. It will be apparent to persons skilled in the art that a number of variations and modifications can be made without departing from the scope of the invention as defined in the claims. Examples of such modifications include the substitution of known equivalents for any aspect of the invention in order to achieve the same result in substantially the same way.

The following examples are intended to be exemplary of the invention and are not intended to be limiting.

EXAMPLES

Example 1

Recovery of Lignin Derivatives from Hardwood Feedstocks

Hardwood feedstock chips were prepared from: (1) aspen (*P. tremuloides*) grown in British Columbia, Canada; (2) *acacia* (*A. dealbata*) grown in Chile; and (3) *eucalyptus* (*E. nitens*) grown in Chile. Three samples of each feedstock where were individually pulped using an acid-catalyzed ethanol organosolv pulping process wherein a different set of pulping conditions was used for each sample (Tables 1, 2 and 3).

TABLE 1

Pulping conditions for aspen wood chip samples at 6:1 liquor-to-wood ratio.

| Sample # | pH | Time min | Temperature ° C. | Ethanol % wt. | Ethoxy mmol/g |
|---|---|---|---|---|---|
| 1 | 3.27 | 100 | 166 | 65 | 0.56 |
| 2 | 2.29 | 46 | 169 | 73 | 1.17 |
| 3 | 1.97 | 89 | 172 | 79 | 0.62 |

TABLE 2

Pulping conditions for acacia wood chip samples at 6:1 liquor-to-wood ratio.

| Sample # | pH | Time min | Temperature ° C. | Ethanol % wt. | Ethoxy mmol/g |
|---|---|---|---|---|---|
| 4 | 2.27 | 101 | 180 | 48 | 0.73 |
| 5 | 2.93 | 56 | 176 | 60 | 0.55 |
| 6 | 2.75 | 82 | 191 | 41 | 0.56 |

TABLE 3

Pulping conditions for eucalyptus wood chip samples at 6:1 liquor-to-wood ratio.

| Sample # | pH | Time min | Temperature ° C. | Ethanol % wt. | Ethoxy mmol/g |
|---|---|---|---|---|---|
| 7 | 2.33 | 94 | 177 | 47 | 0.67 |
| 8 | 2.66 | 82 | 191 | 41 | 0.48 |
| 9 | 2.00 | 21 | 166 | 46 | 0.67 |

For each wood chips sample, the ethanol pulping solvent was prepared to the specified concentration by first, partially diluting the ethanol with water after which, a suitable amount of sulphuric acid was added to achieve the target final acidity. Finally, the ethanol solution was further diluted with water to achieve the target ethanol concentration.

The original lignin content of each fibrous biomass sub-sample was determined using the methods described in National Renewable Energy Laboratory (NREL) Technical Report entitled "Determination of Structural Carbohydrates and Lignin in Biomass"—Laboratory Analytical Procedure (TP-510-42618 (25 Apr. 2008)). Then, after adding the fibrous biomass sample to a pressure vessel (2 L or 7 L Parr reactor (Parr Instrument Company, Moline, Ill., USA)) (100-700 g odw chips), the pH-adjusted ethanol-based pulping solvent was added to the vessel at a 6:1 liquor:wood ratio & the pH recorded. The vessel was then pressurized and brought up to the target temperature listed in Tables 1-3 (aspen, *acacia, eucalyptus*, respectively). The biomass sample was then "cooked" for the specified period of time, after which, the pulping process was stopped. After pulping, the contents of the pressure vessel were transferred to a hydraulic 20 ton manual shop press (Airco, China). The liquor was separated from the solids by first squeezing the pulped materials in the press to express the liquor. The expressed liquor was then filtered through a coarse silk screen to separate expressed chip residues from liquor stream. Next, fine particles were separated out from the liquor stream by filtration through fine filter paper (Whatman N° 1). The recovered fine particles represent lignin derivatives that were extracted and self-precipitated out from the liquor during cooling of the pulped biomass. The particulate lignin is herein referred to as self-precipitated lignin derivatives (i.e., "SPL"). The solubilized lignin derivatives still remaining in the filtered liquor were precipitated from by dilution with cold water. The lignin derivatives precipitated by dilution with cold water are referred to as precipitated lignin or "PL". After determination of the dry weights of SPL and PL lignin derivatives, the relative yield of each lignin derivative was determined in reference to total native lignin (sum of the acid-insoluble lignin and acid-soluble lignin) value determined for the original biomass sample before pulping. The yield of PL lignin derivatives for each sample is shown in Tables 1-3 on a weight % basis relative to their original lignin (acid-insoluble lignin plus acid-soluble lignin values).

The ethoxyl groups content can be measured by quantitative $^{13}$C high resolution NMR spectroscopy of acetylated and non-acetylated lignin derivatives, using, for instance, 1,3,5-trioxane and tetramethyl silane (TMS) as internal references. For the data analysis "BASEOPT" (DIGMOD set to baseopt) routine in the software package TopSpin 2.1.4 was used to predict the first FID data point back at the mid-point of $^{13}$C r.f. pulse in the digitally filtered data was used. For the NMR spectra recording a Bruker AVANCE II digital NMR spectrometer running TopSpin 2.1 was used. The spectrometer used a Bruker 54 mm bore Ultrashield magnet operating at 14.1 Tesla (600.13 MHz for $^1$H, 150.90 MHz for $^{13}$C). The spectrometer was coupled with a Bruker QNP cryoprobe (5 mm NMR samples, $^{13}$C direct observe on inner coil, $^1$H outer coil) that had both coils cooled by helium gas to 20K and all preamplifiers cooled to 77K for maximum sensitivity. Sample temperature was maintained at 300 K±0.1 K using a Bruker BVT 3000 temperature unit and a Bruker BCU05 cooler with ca. 95% nitrogen gas flowing over the sample tube at a rate of 800 L/h. Resonance of ethoxyl groups is seen at 16.0-14.5 ppm both in the acetylated adn non-acetylated lignin spectra.

Identification of ethoxyl groups was confirmed by 2D NMR HSQC spectroscopy. 2D NMR spectra were recorded by a Bruker 700 MHz UltraShield Plus standard bore magnet spectrometer equipped with a sensitive cryogenically cooled 5 mm TCI gradient probe with inverse geometry. The acquisition parameters were as follow: standard Bruker pulse program hsqcetgp, temperature of 298 K, a 90° pulse, 1.1 sec pulse delay (d1), and acquisition time of 60 msec.

Example 2

Recovery of Lignin Derivatives from Softwood Feedstocks

Softwood feedstock chips were prepared from: (1) hybrid spruce trees grown in British Columbia, (2) radiata pine grown in Chile, and (3) loblolly pine grown in south eastern USA. Three samples from each feedstock were individually pulped using an acid-catalyzed ethanol pulping process wherein a different set of pulping conditions was used for each sample (Tables 8, 9 and 10).

TABLE 8

Pulping conditions for hybrid spruce wood chip samples at 6:1 liquor-to-wood ratio.

| Sample # | pH | Time min | Temperature °C. | Ethanol % wt. | Ethoxy mmol/g |
|---|---|---|---|---|---|
| 10 | 2.11 | 34 | 172 | 79 | 0.90 |
| 11 | 2.43 | 49 | 179 | 45 | 0.73 |
| 12 | 1.89 | 31 | 167 | 52 | 0.66 |

TABLE 9

Pulping conditions for radiata pine wood chip samples at 6:1 liquor-to-wood ratio.

| Sample # | pH | Time min | Temperature °C. | Ethanol % wt. | Ethoxy mmol/g |
|---|---|---|---|---|---|
| 13 | 1.72 | 32 | 182 | 50 | 0.59 |
| 14 | 3.01 | 60 | 182 | 62 | 1.01 |
| 15 | 2.04 | 34 | 172 | 79 | 1.02 |

TABLE 10

Pulping conditions for loblolly pine wood chip samples at 6:1 liquor-to-wood ratio.

| Sample # | pH | Time min | Temperature °C. | Ethanol % wt. | Ethoxy mmol/g |
|---|---|---|---|---|---|
| 16 | 2.15 | 59 | 171 | 42 | 0.52 |
| 17 | 2.58 | 51 | 176 | 65 | 0.77 |
| 18 | 2.65 | 84 | 184 | 76 | 0.97 |

For each wood chips sample, the ethanol pulping solvent was prepared to the specified concentration by first, partially diluting the ethanol with water after which, a suitable amount of sulphuric acid was added to achieve the target final acidity. Finally, the ethanol solution was further diluted with water to achieve the target ethanol concentration.

The lignin content of each original fibrous biomass subsample was determined using the NREL method (NREL/TP-510-42618 (April 2008)). Then, after adding the fibrous biomass sample to a pressure vessel (2L or 7 L Parr reactor (Parr Instrument Company, Moline, Ill., USA) (100-700 g odw chips), the pH-adjusted ethanol-based pulping solvent was added to the vessel at a 6:1 liquor:wood ratio & the pH recorded.

The vessel was then pressurized and brought up to the target temperature listed in Tables 8-10 (spruce, radiata pine, loblolly pine, respectively). The biomass sample was then "cooked" for the specified period of time, after which, the pulping process was stopped. After pulping, the contents of pressure vessel were transferred to a hydraulic 20 ton manual shop press (Airco, China). The liquor was separated from the solids by first squeezing the pulped materials in the press to express the liquor.

The expressed liquor was then filtered through a coarse silk screen to separate expressed chip residues from liquor stream. Next, fine particles were separated out from the liquor stream by filtration through fine filter paper (Whatman N° 1). The recovered fine particles represent lignin derivatives that were extracted and self-precipitated out from the liquor during cooling of the pulped biomass. The particulate lignin is herein referred to as self-precipitated lignin derivatives (i.e., "SPL"). The solubilized lignin derivatives still remaining in the filtered liquor were precipitated from by dilution with cold water. The lignin derivatives precipitated by dilution with cold water are referred to as precipitated lignin or "PL". After determination of the dry weights of SPL and PL lignin derivatives, the relative yield of each lignin derivative was determined in reference to the total lignin content (acid-insoluble plus the acid-soluble lignin) determined for the original biomass sample before pulping. The yield of PL lignin derivatives for each sample is shown in Tables 8-10 on a weight % basis relative to total lignin in the original biomass.

The ethoxyl groups content can be measured by quantitative $^{13}$C high resolution NMR spectroscopy of acetylated and non-acetylated lignin derivatives, using, for instance, 1,3,5-trioxane and tetramethyl silane (TMS) as internal references. For the data analysis "BASEOPT" (DIGMOD set to baseopt) routine in the software package TopSpin 2.1.4 was used to predict the first FID data point back at the mid-point of $^{13}$C r.f. pulse in the digitally filtered data was used.

For the NMR spectra recording a Bruker AVANCE II digital NMR spectrometer running TopSpin 2.1 was used. The spectrometer used a Bruker 54 mm bore Ultrashield magnet operating at 14.1 Tesla (600.13 MHz for $^1$H, 150.90 MHz for $^{13}$C). The spectrometer was coupled with a Bruker QNP cryoprobe (5 mm NMR samples, $^{13}$C direct observe on inner coil, $^1$H outer coil) that had both coils cooled by helium gas to 20K and all preamplifiers cooled to 77K for maximum sensitivity. Sample temperature was maintained at 300 K±0.1 K using a Bruker BVT 3000 temperature unit and a Bruker BCU05 cooler with ca. 95% nitrogen gas flowing over the sample tube at a rate of 800 L/h. Resonance of ethoxyl groups is seen at 16.0-14.5 ppm both in the acetylated adn non-acetylated lignin spectra.

Identification of ethoxyl groups was confirmed by 2D NMR HSQC spectroscopy. 2D NMR spectra were recorded by a Bruker 700 MHz UltraShield Plus standard bore magnet spectrometer equipped with a sensitive cryogenically cooled 5 mm TCI gradient probe with inverse geometry. The acquisition parameters were as follow: standard Bruker pulse program hsqcetgp, temperature of 298 K, a 90° pulse, 1.1 sec pulse delay (d1), and acquisition time of 60 msec.

Example 3

Recovery of Lignin Derivatives from Annual Fibre Feedstocks

Two sets of annual fibre feedstock materials were prepared from: (1) corn cobs produced in Europe, (2) bagasse produced from sugarcane grown and processed in Brazil, and (3) wheat straw produced in Alberta, Canada. Three samples of the each feedstock were individually pulped using an acid-catalyzed ethanol pulping process based wherein a different set of pulping conditions was used for each sample (Table 14, 15 and 16).

TABLE 14

Pulping conditions for corn cob samples at 6:1 liquor-to-wood ratio.

| Sample # | pH | Time min | Temperature ° C. | Ethanol % wt. | Ethoxy mmol/g |
|---|---|---|---|---|---|
| 19 | 2.11 | 106 | 176 | 38 | 0.35 |
| 20 | 2.33 | 49 | 192 | 37 | 0.32 |
| 21 | 2.19 | 39 | 189 | 50 | 0.40 |

TABLE 15

Pulping conditions for sugarcane bagasse samples at 6:1 liquor-to-wood ratio.

| Sample # | pH | Time min | Temperature ° C. | Ethanol % wt. | Ethoxy mmol/g |
|---|---|---|---|---|---|
| 22 | 3.26 | 32 | 197 | 51 | 0.50 |
| 23 | 3.19 | 81 | 181 | 57 | 0.47 |
| 24 | 2.06 | 47 | 176 | 38 | 0.54 |

TABLE 16

Pulping conditions for wheat straw samples at 6:1 liquor-to-wood ratio.

| Sample # | pH | Time min | Temperature ° C. | Ethanol % wt. | Ethoxy mmol/g |
|---|---|---|---|---|---|
| 25 | 1.97 | 93 | 165 | 40 | 0.56 |
| 26 | 2.23 | 100 | 190 | 67 | 0.62 |
| 27 | 2.49 | 53 | 185 | 72 | 0.55 |

For each biomass sample, the ethanol pulping solvent was prepared to the specified concentration by first, partially diluting the ethanol with water after which, a suitable amount of sulphuric acid was added to achieve the target final acidity. Finally, the ethanol solution was further diluted with water to achieve the target ethanol concentration.

The original lignin content of each fibrous biomass sub-sample was determined using the NREL method (NREL/TP-510-42618 (April 2008)). Then, after adding the fibrous biomass sample to a pressure vessel (2L or 7L Parr reactor (Parr Instrument Company, Moline, Ill., USA) (100-700 g odw chips), the pH-adjusted ethanol-based pulping solvent was added to the vessel at a 6:1 liquor:biomass ratio & the pH recorded. The vessel was then pressurized and brought up to the target temperature listed in Tables 14-16 (bagasse, corn-cobs, wheat straw respectively). The biomass sample was then "cooked" for the specified period of time, after which, the pulping process was stopped. After pulping, the contents of pressure vessel were transferred to a hydraulic 20 ton manual shop press (Aicro, China). The liquor was separated from the solids by first squeezing the pulped materials in the press to express the liquor. The expressed liquor was then filtered through a coarse silk screen to separate expressed chip residues from liquor stream. Next, fine particles were separated out from the liquor stream by filtration through fine filter paper (Whatman N° 1). The recovered fine particles represent lignin derivatives that were extracted and self-precipitated out from the liquor during cooling of the pulped biomass. The particulate lignin is herein referred to as self-precipitated lignin derivatives (i.e., "SPL"). The solubilized lignin derivatives still remaining in the filtered liquor were precipitated from by dilution with cold water. The lignin derivatives precipitated by dilution with cold water are referred to as precipitated lignin or "PL". After determination of the dry weights of SPL and PL lignin derivatives, the relative yield of each lignin derivative was determined in reference to the total lignin (sum of acid-insoluble lignin plus acid-soluble lignin) value determined for the original biomass sample before pulping. The yield of PL lignin derivatives for each sample is shown in Tables 14-16 on a weight % basis relative to their original total lignin values.

The ethoxyl groups content can be measured by quantitative $^{13}$C high resolution NMR spectroscopy of acetylated and non-acetylated lignin derivatives, using, for instance, 1,3,5-trioxane and tetramethyl silane (TMS) as internal references. For the data analysis "BASEOPT" (DIGMOD set to baseopt) routine in the software package TopSpin 2.1.4 was used to predict the first FID data point back at the mid-point of $^{13}$C r.f. pulse in the digitally filtered data was used. For the NMR spectra recording a Bruker AVANCE II digital NMR spectrometer running TopSpin 2.1 was used. The spectrometer used a Bruker 54 mm bore Ultrashield magnet operating at 14.1 Tesla (600.13 MHz for $^1$H, 150.90 MHz for $^{13}$C). The spectrometer was coupled with a Bruker QNP cryoprobe (5 mm NMR samples, $^{13}$C direct observe on inner coil, $^1$H outer coil) that had both coils cooled by helium gas to 20K and all preamplifiers cooled to 77K for maximum sensitivity. Sample temperature was maintained at 300 K±0.1 K using a Bruker BVT 3000 temperature unit and a Bruker BCU05 cooler with ca. 95% nitrogen gas flowing over the sample tube at a rate of 800 L/h. Resonance of ethoxyl groups is seen at 16.0-14.5 ppm both in the acetylated and non-acetylated lignin spectra.

Identification of ethoxyl groups was confirmed by 2D NMR HSQC spectroscopy. 2D NMR spectra were recorded by a Bruker 700 MHz UltraShield Plus standard bore magnet spectrometer equipped with a sensitive cryogenically cooled 5 mm TCI gradient probe with inverse geometry. The acquisition parameters were as follow: standard Bruker pulse program hsqcetgp, temperature of 298 K, a 90" pulse, 1.1 sec pulse delay (d1), and acquisition time of 60 msec.

Example 4

Synthesis of Lignin-Phenol-Formaldehyde (LPF) Resins for Wood Composites

LPF Resins were synthesized from a 40/60 Lignin/Phenol mixture, and at a Phenol:Formaldehyde molar ratio of 1:2.55. Reagents & equipment used for the synthesis method:

12.76 g 50% NaOH solution (Fisher Scientific, CAS 1310-73-2, Cat# SS410-4)

42.4 g 37% Formaldehyde solution (Fisher Scientific, CAS 50-00-0, Cat# F79-4)

19.28 g Phenol (Fisher Scientific, CAS108-95-2, Cat# A91I-212)

32.71 g Nanopure water (18.2 MΩ*cm or better)

12.85 g Lignin derivatives produced by Lignol Innovations, Ltd., Burnaby, B C, Canada 250 ml 3-neck round bottom flasks
Small condenser
Corning brand thermocouple
Rubber stoppers
Rubber stoppers with a hole punched in center to accept a thermocouple
Teflon covered magnetic stir bar
Hot-stirring plates
Medium crystallizing dish that fit the 250 ml round bottom flask
1 big crystallizing dish
Small plastic funnel
100 ml beaker
1 small glass funnel
3-50 ml volumetric flasks with glass stoppers
2 pieces of connecting tubing for the condensers
2 clamps for the flasks and condensers
Metal stand
Weighing dish
Portable Viscolite viscometer from Hydramotion Ltd. (York, England)

The reagents were weighed and synthesis resin reactors were set-up by connecting the condensers with the tubing in series, clamping the round bottom flask on top of the crystallizing dish, sitting on a hot-stirring plate. Thermocouples were inserted through rubber stoppers and placed in the centre joint of the flask. The clamped condenser was placed in one of the side joints of the flask. A magnetic stir bar was placed in the flask. On another hot-stirring plate a big crystallizing dish was placed containing the jar with solid phenol. Sufficient hot water was added to the crystallizing dish to cover the level of solid phenol in the jar. The water was heated to approximately 70-80° C. in order to melt the phenol.

While the phenol was melting, 100 mL beaker and a small glass funnel was heated in a 105° C. oven. Hot water was added in the crystallizing dishes containing the flasks, and the hotplate temperature set to 55° C. When the phenol was molten and the hotplate had achieved 55° C., the phenol was removed from the hot water bath. 19.3 g of molten phenol was added to the hot, 100 mL beaker. Liquid phenol was poured through the hot glass funnel into the round bottom flask.

Over 10-15 minutes 12.85 g of lignin derivative was added in small amounts to the flasks through a small plastic funnel Stirring speed was 300 rpm and as the mixture viscosity increased the stirring speed was gradually be increased to 340 rpm.

The stirring speed was reduced to 300 rpm. 32.71 g of deionized water and 12.76 g 50% NaOH solution was poured into the flask. The temperature may increase due to the exothermic nature of the reaction. Once the reaction temperature was stabilized at 55° C. the mixture was left to stand for 10 additional minutes then 42.4 g 37% formaldehyde solution was slowly added. The temperature was increased to 70° C. and left for it to stabilize (approx. 10 mins). Once the temperature had stabilized, the hotplate was set to 75° C. After the reaction achieved 75° C. it was held for 3 hours. The hotplate maintained the reaction temperature throughout the experiment. The water level was monitored and hot water added as necessary. The level was kept above the resin level within the flask.

After 3 h at 75° C., the reaction temperature was increased to 80° C. and, after stabilization, maintained for 2.5 hours. The level of water in crystallizing dishes was monitored to ensure it did not drop below that of the resin in the flasks.

A few minutes before the 2 h 30 minutes are done, prepare 2 big crystallizing dishes with cold water. After 2 h 30 min at 80° C., the hotplate was adjusted to 35° C., and the flask with the condenser raised above the crystallizing dish. The dish with hot water was removed and poured away. A big crystallizing dish with cold water was placed on the hot plate and the flask with the condenser lowered in the cold water bath. More cold water was poured in until the flask is immersed up to the joints' level in cold water. The flask was kept immersed, under continuous stirring and in cold water, until the temperature in the reaction mixture stabilized at 35° C. The reaction was then removed from the cold water bath.

The bond strength (also called "shear strength") of LPF resins was tested by the ABES method (Wescott, J. M., Birkeland, M. J., Traska, A. E., New Method for Rapid Testing of Bond Strength for Wood Adhesives, Heartland Resource Technologies Waunakee, Wis., U.S.A. and Frihart, C. R. and Dally, B. N., USDA Forest Service, Forest Products Laboratory, Madison, Wis., U.S.A., Proceedings 30th Annual Meeting of The Adhesion Society, Inc., Feb. 18-21, 2007, Tampa Bay, Fla., USA) under the following conditions: sliced aspen strands: 117 mm×20 mm×0.8 mm (conditioned at 50% HR & 20° C.), bonding area: 20 mm×5 mm, press temperature: 150° C., press pressure: 2 MPa, press time: 90 seconds. Ten replicates for each resin sample were run. The average bond strength in MPa of ten replicates was then normalized dividing by the grams loaded resin per square centimeter of bonding area to yield the Normalized Bond Strength (NBS) or normalized shear strength The results of the bond strength testing are shown in Table 17:

TABLE 17

Normalized Bond Strength (NBS) at 150° C. (MPa*cm$^2$/g)

| SAMPLE | NBS |
| --- | --- |
| 1 | 3,379 |
| 2 | 3,485 |
| 3 | 3,706 |
| 4 | 3,258 |
| 5 | 3,462 |
| 6 | 3,655 |
| 7 | 3,553 |
| 8 | 3,549 |
| 9 | 3,504 |
| 10 | 3,707 |
| 11 | 3,692 |
| 12 | 3,604 |
| 13 | 3,552 |

TABLE 17-continued

Normalized Bond Strength (NBS) at 150° C. (MPa*cm²/g)

| SAMPLE | NBS |
|---|---|
| 14 | 3,607 |
| 15 | 3,345 |
| 16 | 3,634 |
| 17 | 3,546 |
| 18 | 3,563 |
| 19 | 3,537 |
| 20 | 3,576 |
| 21 | 3,490 |
| 22 | 3,685 |
| 23 | 3,506 |
| 24 | 3,452 |
| 25 | 3,504 |
| 26 | 3,541 |
| 27 | 3,511 |

The invention claimed is:

1. A lignin derivative extracted from a lignocellulosic biomass, wherein immediately following extraction the lignin derivative has an ethoxy content of from 0.5 mmol/g to 1.4 mmol/g, a polydispersity of from about 1.2 to about 4, and an aliphatic hydroxyl content of from about 0.2 mmol/g to about 6.5 mmol/g.

2. The lignin derivative according to claim 1 wherein the derivative has an ethoxy content of about 0.5 mmol/g to about 1.3 mmol/g.

3. The lignin derivative according to claim 1 wherein the derivative has an ethoxy content of about 0.6 mmol/g to about 1.3 mmol/g.

4. The lignin derivative according to claim 1 wherein the lignin is derived from hardwood biomass.

5. The lignin derivative according to claim 1 wherein the lignin is derived from softwood biomass.

6. The lignin derivative according to claim 1 wherein the lignin derivative is derived from annual fibre biomass.

7. The lignin derivative according to claim 1 wherein the biomass comprises *Populus* spp, *Eucalyptus* spp., *Acacia* spp., or combinations/hybrids thereof.

8. The lignin derivative according to claim 1 wherein the biomass comprises *Populus tremuloides, Eucalyptus globulus, Acacia dealbata*, or combinations/hybrids thereof.

9. The lignin derivative according to claim 1 wherein the biomass comprises pine; spruce; and combinations/hybrids thereof.

10. The lignin derivative according to claim 1 wherein the biomass comprises *Pinus radiata, Pinus taeda*, BC spruce, or combinations/hybrids thereof.

11. The lignin derivative according to claim 1 wherein the biomass comprises wheat straw, bagasse, corn cobs, or combinations/hybrids thereof.

12. A phenol composition comprising a lignin derivative and phenol, wherein the lignin derivative is extracted from a lignocellulosic biomass, wherein immediately following extraction the lignin derivative has an ethoxy content of from 0.45 mmol/g to 1.4 mmol/g, an aliphatic hydroxyl content of from about 0.2 mmol/g to about 6.5 mmol/g, and the weight ratio of lignin:phenol is from about 1:4 to about 4:1.

13. A phenol-formaldehyde resin composition comprising from about 0.5% to about 20%, by weight, of a lignin derivative extracted from a lignocellulosic biomass, wherein immediately following extraction the lignin derivative has an ethoxy content of from 0.45 mmol/g to 1.4 mmol/g, an aliphatic hydroxyl content of from about 0.2 mmol/g to about 6.5 mmol/g.

14. A method of producing a lignin derivative according to claim 1, said method comprising:
a) pulping a fibrous biomass in a vessel with an organic solvent/water solvent solution to form a liquor, wherein:
  i. the solution comprises about 30% or greater, by weight, of organic solvent; and
  ii. the pH of the liquor is from about 1 to about 6;
b) heating the liquor to about 100° C. or greater;
c) maintaining the elevated temperature and pressure for 1 minute or longer;
d) separating the cellulosic pulps from the pulping liquor; and
e) recovering derivatives of native lignin.

* * * * *